Jan. 15, 1946.  W. L. DOUDEN  2,392,979
LUMINOUS RETICLE
Filed Oct. 31, 1942
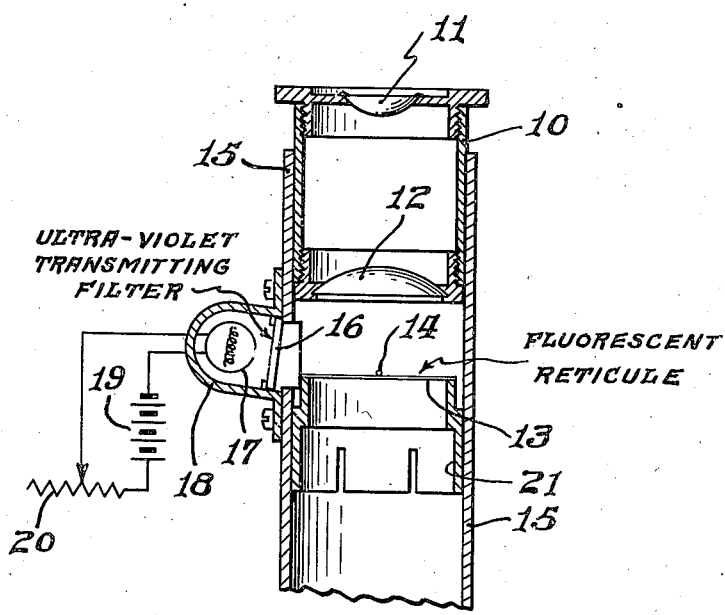
Inventor
William L. Douden
By
CD Tuska
Attorney Patented Jan. 15, 1946

2,392,979

UNITED STATES PATENT OFFICE 2,392,979

LUMINOUS RETICLE

William L. Douden, Philadelphia, Pa., assignor to Radio Corporation of America, a corporation of Delaware Application October 31, 1942, Serial No. 464,045

4 Claims. (Cl. 250—71)

This invention relates to a luminous reticle for use in optical instruments used at low intensity of illumination.

Many types of optical instruments are used at very low levels of luminosity in the field of the instrument during at least a portion of the time. As examples of such instruments there are astronomical telescopes, gun sights, bomb sights and periscopes. These instruments are usually equipped with some appropriate type of reticle having either cross hairs or an engraved scale.

When used at low illumination, it has heretofore been customary to illuminate the reticle in some manner. For example, cross hairs or spider web lines have been illuminated by light directed onto them, while the engraved type of reticle has been in some instances illuminated in the same manner, i. e., by appropriately directing light to the lines to be viewed or by using a reflected image of the illuminated engraving.

All of these prior art devices have been more or less unsatisfactory in that a certain amount of stray light from the illumination of the reticle has found its way into the optical system, thereby tending to mask the field of view by the stray light and in addition decreasing the visibility of the field of view by the effect on the observer's eye. The latter effect is particularly undesirable in instruments requiring the use of the completely dark adapted eye.

In my improved luminous reticle these effects of stray light are avoided by providing indicia of fluorescent material for the reticle and illuminating these indicia by invisible light, such as the ultraviolet which will cause them to fluoresce. Inasmuch as the exciting source produces no visible illumination, any stray light therefrom can have no visible effect on the field and since the indicia on the reticle are illuminated only to such degree as will render them visible under the conditions of operation, the stray light from the indicia will not produce any deleterious effect.

One object of the invention is to provide an improved luminous reticle.

Another object of the invention is to provide a luminous reticle which will preclude the possibility of stray light in the visual field.

Another object of the invention is to provide a reticle which is rendered luminous by the use of fluorescence.

Other and incidental objects of the invention will be apparent to those skilled in the art from a reading of the following specification and an inspection of the accompanying drawing in which:

The single figure of drawing is a longitudinal section through the eye-piece end of an optical device constructed in accordance with my invention.

In the drawing, the eye-piece tube of the instrument 15 carries an eye-piece 10 which is here illustrated as of the usual Ramsden type including the lenses 11 and 12 which have at their focal plane the cross hairs 13, 14. The cross hairs are indicated as mounted on an appropriate member 21 permitting their proper location in the tube 15. The cross hairs 13, 14 are illuminated by an incandescent lamp 17 which is used for simplicity although other types of light source may be used. If an incandescent lamp is used, the filament should be operated at such a temperature as to secure the proper amount of ultraviolet light. The lamp 17 is enclosed within an appropriate housing 18 and between the lamp 17 and the interior of the eye-piece tube 15 there is provided an ultraviolet transmitting filter 16 to prevent visible light from reaching the cross hairs 13, 14.

This ultraviolet transmitting filter may be constructed in any of the usual ways, as for example, it may be a thin piece of quartz or glass having on its surface a layer of silver of sufficient thickness to effectively screen out the visible rays and transmit an appropriate amount of the ultraviolet or it may be one of the commercially available ultraviolet transmitting glasses designed particularly for the illumination of fluorescent materials. As examples of the ultraviolet transmitting glasses limiting the passage of visible light, there are the red purple ultra glass No. 5874 and No. 5970, and red purple Corex A glass No. 9813 of the Corning Glass Works. These glasses transmit a small percentage of the visible light but for many purposes, the quantity of this visible light is so much less than the stray light which would occur with other types of luminous reticles that it may be neglected. This slight transmission of visible light may be effectively prevented by a thin layer of silver over the surface of the filter glass 16 or an appropriate filter may be inserted in the eye-piece 10 or between the eye-piece and the reticle 13, 14 which will absorb this visible portion of the light without absorbing a large percentage of the light emitted from the reticle. Alternatively, either the lens 11 or the lens 12 of the eye-piece may be composed of appropriate filter glass and either these lenses or the filter referred to above may be of such characteristics or composition as to absorb ultraviolet light, thereby preventing any effect of stray ultraviolet upon the accommodation of the observer's eye.

The incandescent lamp 17 may be supplied with current from an appropriate source 19, the value of which may be regulated by an appropriate resistor or equivalent device 20. It will be apparent that the brightness of the source 17 should be adjusted so that the luminescence of the reticle is no greater than is required under the conditions of observation.

If relatively heavy cross hairs are used at 13 and 14, they may be coated with any of the usual materials fluorescent under ultraviolet light. If strands of spider webs are used as is the case in many types of scientific instruments and it is desired to avoid any enlargement of the line, the material may be dyed with one of the appropriate fluorescent dyes, such, for example, as anthracene, fluorescein or quinine. If an engraved reticle is used, the engraving should be filled with an appropriate fluorescent material, the choice of material depending upon the color of fluorescence desired, the size of the engraved grooves and the grain size of the material available.

It will be apparent to those skilled in the art that it is not essential that the light source be mounted immediately adjacent the side of the reticle as illustrated but the light source may be mounted in any appropriate location and the ultraviolet light directed onto the fluorescent material by an appropriate reflector or refractor.

Having described my invention, I now claim:

1. A luminous reticle for an optical instrument including indicia of fluorescent material and an ultraviolet light source associated with said instrument and outside its field of view for illuminating said fluorescent material substantially exclusively with ultraviolet light.

2. In combination, an optical instrument, a reticle therein of fluorescent material, an eye-piece located for viewing said reticle, an incandescent light source located outside the field of view of said instrument to illuminate said reticle with invisible light adapted to produce fluorescence, and means for preventing visible light from said source reaching said eye-piece.

3. In combination, an optical instrument, a reticle therein having indicia of fluorescent material, an eye-piece located for viewing said reticle, an incandescent light source located outside the field of view of said instrument to illuminate said reticle with invisible light adapted to produce fluorescence, and means for preventing visible light from said source reaching said eye-piece.

4. In combination, an optical instrument, a reticle therein having indicia of fluorescent material, an eye-piece located for viewing said reticle, an incandescent light source located outside the field of view of said instrument to illuminate said reticle, and a filter between said source and said reticle transmitting invisible light adapted to produce fluorescence of said indicia.

WILLIAM L. DOUDEN.